United States Patent
Whalen et al.

[11] Patent Number: 5,948,066
[45] Date of Patent: Sep. 7, 1999

[54] SYSTEM AND METHOD FOR DELIVERY OF INFORMATION OVER NARROW-BAND COMMUNICATIONS LINKS

[75] Inventors: Jon S. Whalen, Arlington Heights, Ill.; David Whittington, Austin, Tex.; Scott Zabolotzky, Elgin, Ill.; Rodd Zurcher, Lake Zurich, Ill.; David Biersach, Lake in the Hills, Ill.

[73] Assignee: Motorola, Inc., Schaumburg, Ill.

[21] Appl. No.: 08/816,914

[22] Filed: Mar. 13, 1997

[51] Int. Cl.⁶ ............................. G06F 13/38; G06F 13/14
[52] U.S. Cl. .......................... 709/229; 709/202; 709/203; 709/219; 709/218; 709/228; 709/233; 709/237; 709/247; 709/206; 709/105; 395/187.01
[58] Field of Search ............................... 395/671, 187.01; 709/203, 219, 229, 247, 237, 226, 218, 228, 233, 202, 105

[56] References Cited

U.S. PATENT DOCUMENTS

| | | | |
|---|---|---|---|
| 5,239,662 | 8/1993 | Danielson et al. | 709/246 |
| 5,706,435 | 1/1998 | Barabara et al. | 395/865 |
| 5,708,780 | 1/1998 | Levergood et al. | 395/200.59 |
| 5,754,774 | 5/1998 | Bittinger et al. | 395/200.33 |
| 5,768,515 | 6/1998 | Choquier et al. | 709/206 |
| 5,802,454 | 9/1998 | Goshay et al. | 455/31.2 |
| 5,850,517 | 12/1998 | Verkler et al. | 709/202 |
| 5,852,717 | 12/1998 | Bhide et al. | 709/203 |
| 5,867,706 | 2/1999 | Martin et al. | 709/105 |
| 5,878,213 | 3/1999 | Bittinger et al. | 709/203 |

*Primary Examiner*—Frank J. Asta
*Assistant Examiner*—William C. Vaughn, Jr.
*Attorney, Agent, or Firm*—Terri S. Hughes

[57] ABSTRACT

System and method for delivery of information over narrow-band communications links. The system has at least a browser (12), a mobile client (10), a fixed server (30) and an origin host (50). The browser (12) requests a resource. The mobile client (10) transmits the request to the fixed server (30). The fixed server (30) retrieves a primary resource from the origin host (50) and any dependent resources. The fixed server (30) transmits the primary resource to the mobile client (10). The mobile client (10) transmits an acknowledgment list to the fixed server (30) requesting certain dependent resources and sends the primary resource to the browser (12). The fixed server (30) transmits the requested dependent resources to the mobile client (10) in one transmission. The mobile client (10) sends the dependent resources to the browser (12) upon request. Thus, only transmitting two round-trips of data across the narrow-band communications link to transfer all the necessary data to create an entire information page reduces the delay significantly.

8 Claims, 8 Drawing Sheets

SYSTEM AND METHOD FOR DELIVERY OF INFORMATION OVER NARROW-BAND COMMUNICATIONS LINKS

FIELD OF THE INVENTION

This invention relates to efficient delivery of information to browser clients over wide-area, narrow-band communications systems, including, but not limited to, Packet Data Networks and Circuit Switched Networks.

BACKGROUND OF THE INVENTION

The World Wide Web (Web) is an ubiquitous communications network used to readily access available resources on many computers throughout the world and is attached to at least one computer network known as the Internet. The Web comprises a body of software, a set of protocols and a set of defined conventions for obtaining information on the Web. The Web utilizes hypertext and multimedia techniques to make the Web "user-friendly" for anyone who desires to browse, roam or contribute to the Web.

A HyperText Transport Protocol (HTTP) is a protocol that is used for transporting hypertext files across the Internet. In ordinary HTTP operation, a proxy receives an HTTP request for a resource and connects to a host identified in a uniform resource locator (URL). A URL is a standardized way of representing different documents, media and network services on the Web. The proxy retrieves the resource and returns a HTTP response to the requester.

In normal HTTP operation, the browser requests a HyperText Markup Language (HTML) response. A HTML is a standardized way to create hypertext documents for use on the Web; HTML is a coding language that surrounds the text used in the hypertext documents with codes and brackets to indicate how the text should appear to the user. When the browser receives the HTML response, the browser parses it and issues individual requests for dependent resources, such as in-line images. Over a narrow-band, high latency connection, this "ping-ponging" (e.g., the browser requesting and receiving each dependent resource individually) results in a severe delay in completing the retrieval of an entire Web page. For a page containing N in-line resources retrieved over a link with an average round-trip latency of L seconds, the delay is approximately ((N+1)*L) seconds.

As a result of delays in delivery of information over narrow-band communications links, there exists a need for a system that delivers information to browser clients over wide-area, narrow-band communications systems in an efficient manner.

A preferred embodiment of the invention, is now described, by way of example only, with reference to the drawings.

BRIEF DESCRIPTION OF THE DRAWINGS

The features of the present invention are set forth with particularity in the appended claims. Preferred embodiments of the invention are now described, by way of example only, with reference to the accompanying drawings in which:

It will be appreciated that for simplicity and clarity of illustration, elements shown in the figures have not necessarily been drawn to scale. Where considered appropriate, reference numerals have been repeated among the figures to indicate corresponding elements.

DETAILED DESCRIPTION OF THE DRAWINGS

A wireless Web proxy system, which is now described, is a system of middleware software which functions as a HTTP proxy incorporating a proprietary protocol for communication of HTTP requests and responses. The wireless Web proxy system provides the means for efficient delivery of information (e.g., Web content) such as text, images, sounds, and other resources, accessed via the HTTP protocol over Transport Control Protocol/Internet Protocol (TCP/IP) networks (Intra-/Internet) to browser clients over wide-area, narrow-band communications systems, including, but not limited to, Packet Data Networks (e.g., DataTAC 4000/5000/6000, Mobitex, CDPD, etc.) and Circuit Switched Networks (e.g., Analog Cellular, GSM, etc.).

Figure 1:
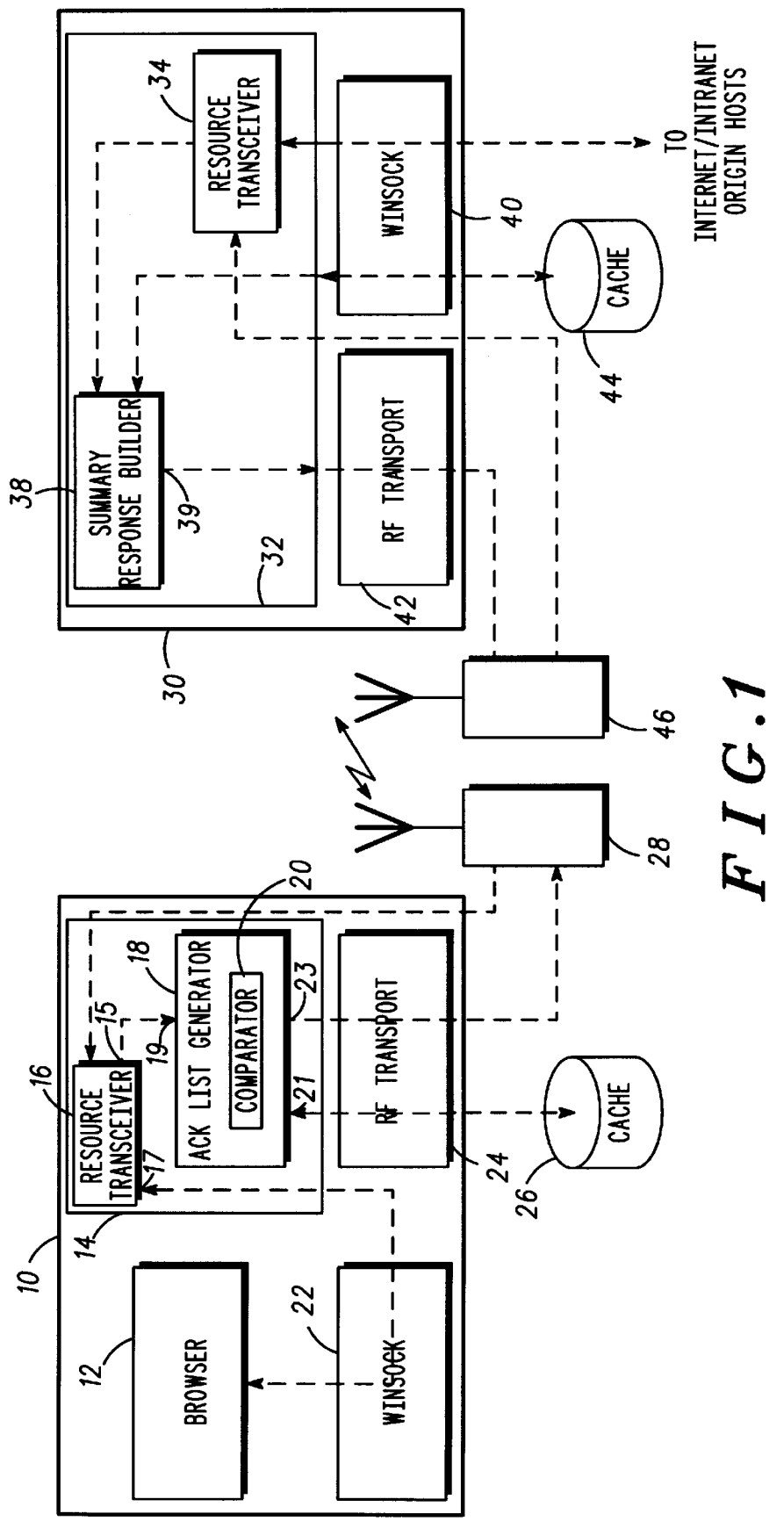
FIG. 1 is an overview diagram of a wireless Web proxy system according to a preferred embodiment of the invention.

As shown in FIG. 1, the wireless Web proxy system consists of mobile proxy software 14 installed on a digital processor 10 of a mobile client and fixed proxy software 32 installed on a digital processor 30 of a fixed server. The mobile proxy software 14 implements an interface which conforms to the specification contained in RFC 1945, "Hypertext Transfer Protocol—HTTP/1.0" for an HTTP 1.0 complaint proxy server. The digital processor 10 comprises at least the following components: a browser 12, the mobile proxy software 14, a winsock 22 and a radio frequency transport 24. The mobile proxy software 14 further comprises at least a resource transceiver 16 and an acknowledgment list generator 18 having at least a comparator 20. Connected to the mobile proxy software 14 of the digital processor 10 is a cache 26 and a radio transceiver 28. The wireless Web proxy system further comprises a memory having instructions and data stored therein that, when executed, causes the digital processor 10 and the cache 26 to comprise the resource transceiver 16 with an input 17 couplable to the browser 12 and an output 15. The acknowledgment list generator 18 has a first input 19 coupled to the output 15 of the resource transceiver 16, a second input 21 coupled to the cache and an output 23 couplable to the radio transceiver 28. Such a configuration allows the comparator 20 to compare the received resources with the cached resources.

The fixed proxy software 32 is installed and executed on the fixed server PC running Windows NT 3.51 or later. The fixed proxy software 32 implements the HTTP 1.0 client protocol and is responsible for retrieving resources from HTTP servers (Web servers) on the Internet or Intranet. The digital processor 30 comprises at least the following components: the fixed proxy software 32, a winsock 40 and a radio frequency transport 42. The fixed proxy software 32 further comprises a resource transceiver 34 and a summary response builder 38. Connected to the fixed proxy software 32 of the digital processor 30 is a cache 44 and a radio transceiver 46. The wireless Web proxy system further comprises a memory having instructions and data stored therein that, when executed, causes the fixed proxy software 32 to comprise the resource transceiver 34 to be coupled to the summary response builder 38, and the summary response builder 38 has an output 39 which provides a summary response which comprises contents from a plurality of resources which when taken together with resources cached locally at the digital processor on the mobile client constitutes an entire information page (e.g., a Web page). In addition, the radio transceiver is coupled to the output 39 of the summary response builder for sending the summary response over a communications link to the browser 12.

A mobile user begins browsing by launching the mobile proxy software 14. This automatically launches the user's preferred Web browser software. The mobile user can browse the Web by entering uniform resource locators (URLs) by following links as he/she is normally accustomed to doing in a wire-line environment (e.g., on a Local Area Network).

Figure 2:
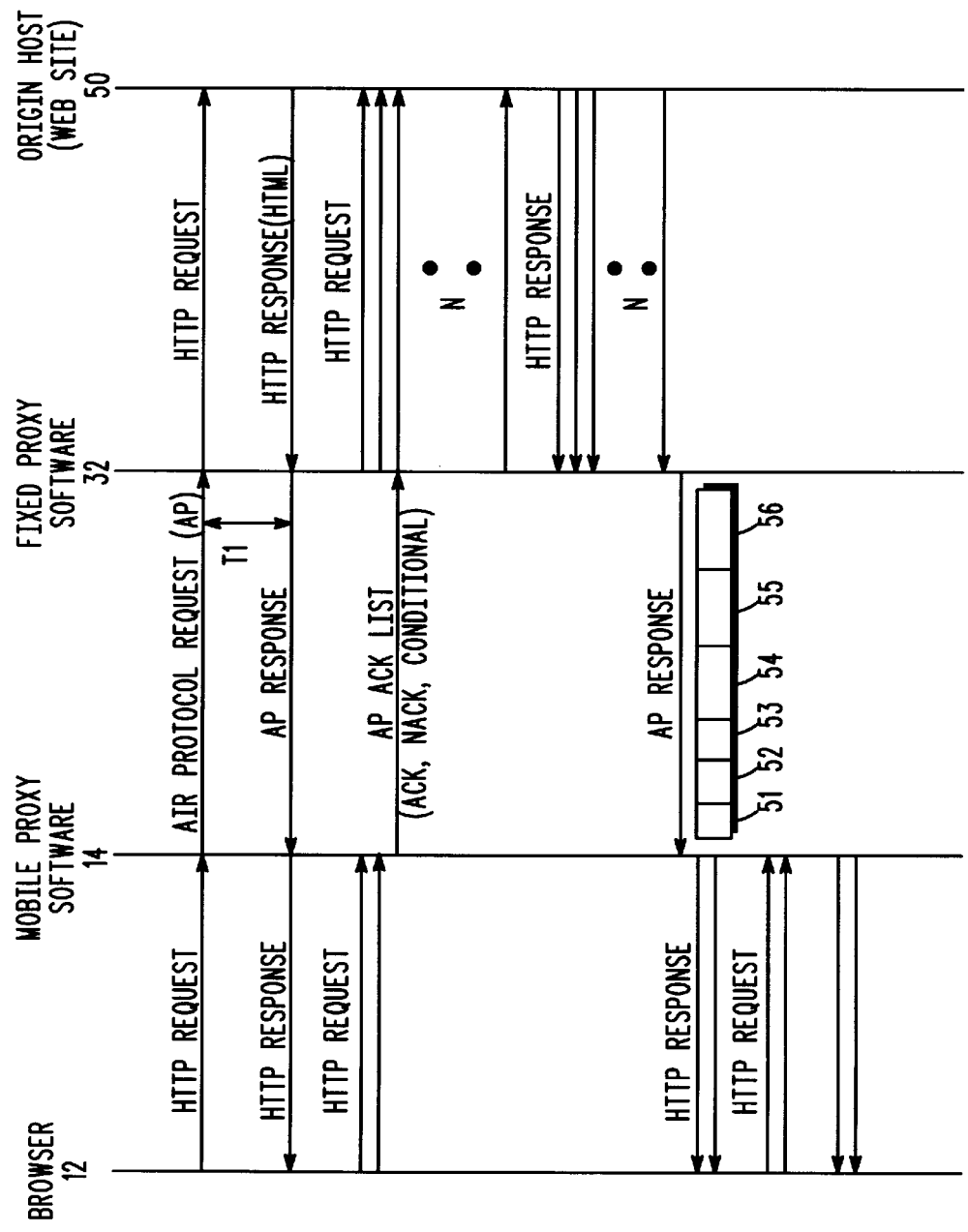
FIG. 2 is a bounce diagram of the preferred embodiment of the invention.

FIG. 2 is a bounce diagram of the preferred embodiment of the invention. In FIG. 2, the browser 12 and the mobile proxy software 14 are the primary components which comprise the mobile client. Also shown in FIG. 2 are the fixed proxy software 32 and the origin host (e.g., Web site) 50. Requests and responses are exchanged between the mobile client and the fixed server over a narrow-band communications link (e.g., the transmissions between the mobile proxy software 14 and the fixed proxy software 32). As shown, the wireless Web proxy protocol only requires transmitting two round-trips of data across the narrow-band communications link to transfer all the necessary data which when taken together with the resources cached locally at the mobile client constitutes an entire information page (e.g., Web page). By reducing data transfer over the narrow-band communications link to a total of two-round-trips, the delay is reduced to 2*L seconds, where the average round-trip latency over a narrow-band communications link is L seconds.

Figure 3:
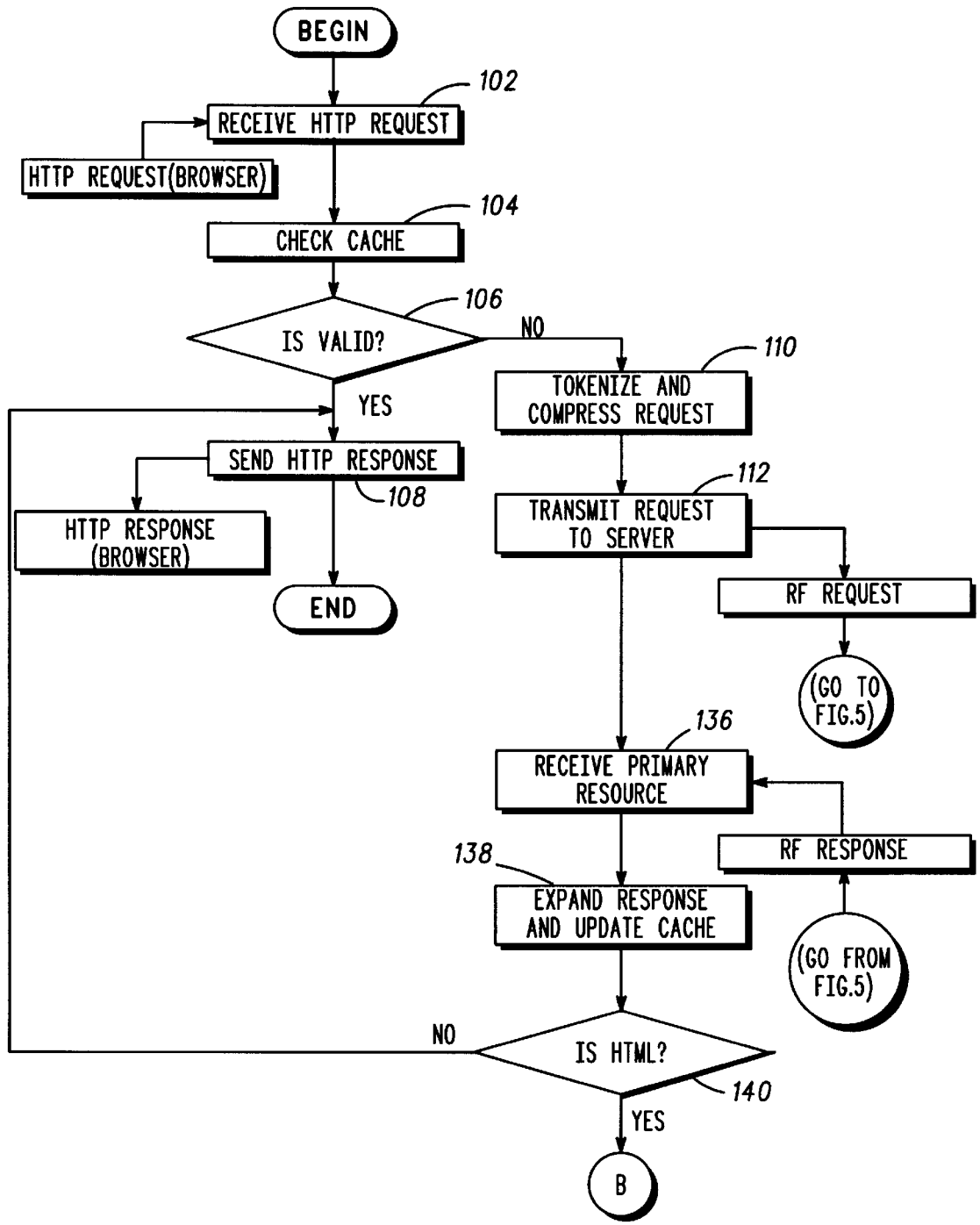
FIGS. 3 and 4 together are a flow chart of an operation of a mobile client according to the preferred embodiment of the invention.
Figure 4:
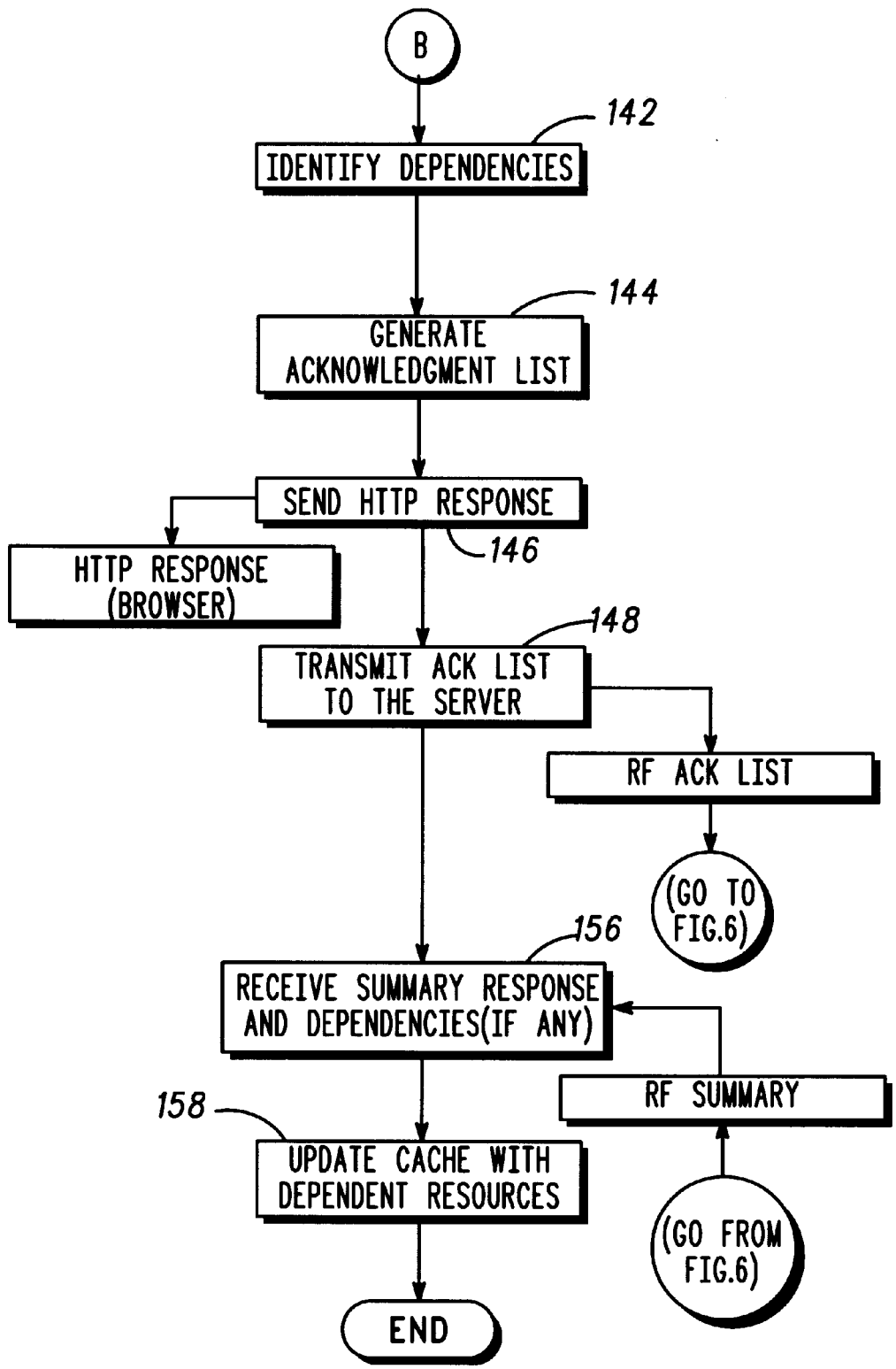

FIGS. 3 and 4 together are a flow chart of an operation of a mobile client 10 according to the preferred embodiment of the invention. The mobile user's browser 12 is configured to treat the mobile software as a Web proxy server. In FIGS. 3 and 4, when the mobile user opens a URL, the browser 12 submits an HTTP request to the mobile client 10. The mobile proxy software 14 receives the HTTP request and examines its local cache (a database of URL-indexed information) at steps 102 and 104. The manner in which the mobile proxy software 14 examines its local cache 26 is described below in conjunction with FIG. 7. The mobile client 10 determines at step 106 whether it can respond to the browser 12 immediately or whether it must ask for the information from the fixed server over the narrow-band communication link. If the mobile client 10 already has certain resources cached (e.g., already has received a page before expiration), then the mobile proxy software 14 informs the fixed proxy software 32 not to send the resources that are cached at the mobile client 10 and the mobile proxy software 14 sends the HTTP response to the browser 12 at step 108. However, if the mobile client 10 decides that it must forward the request to the fixed server 30 because the resource is not cached or the resource has expired, the mobile proxy software 14 transmits the request to the fixed server in the form of a tokenized and compressed HTTP request at steps 110 and 112. The manner in which the HTTP request is tokenized is described below. Thus, from step 112, the operation of the mobile client pauses before proceeding to step 136. During this time, certain steps are performed at the fixed server, as shown in FIGS. 5 and 6.

Figure 5:
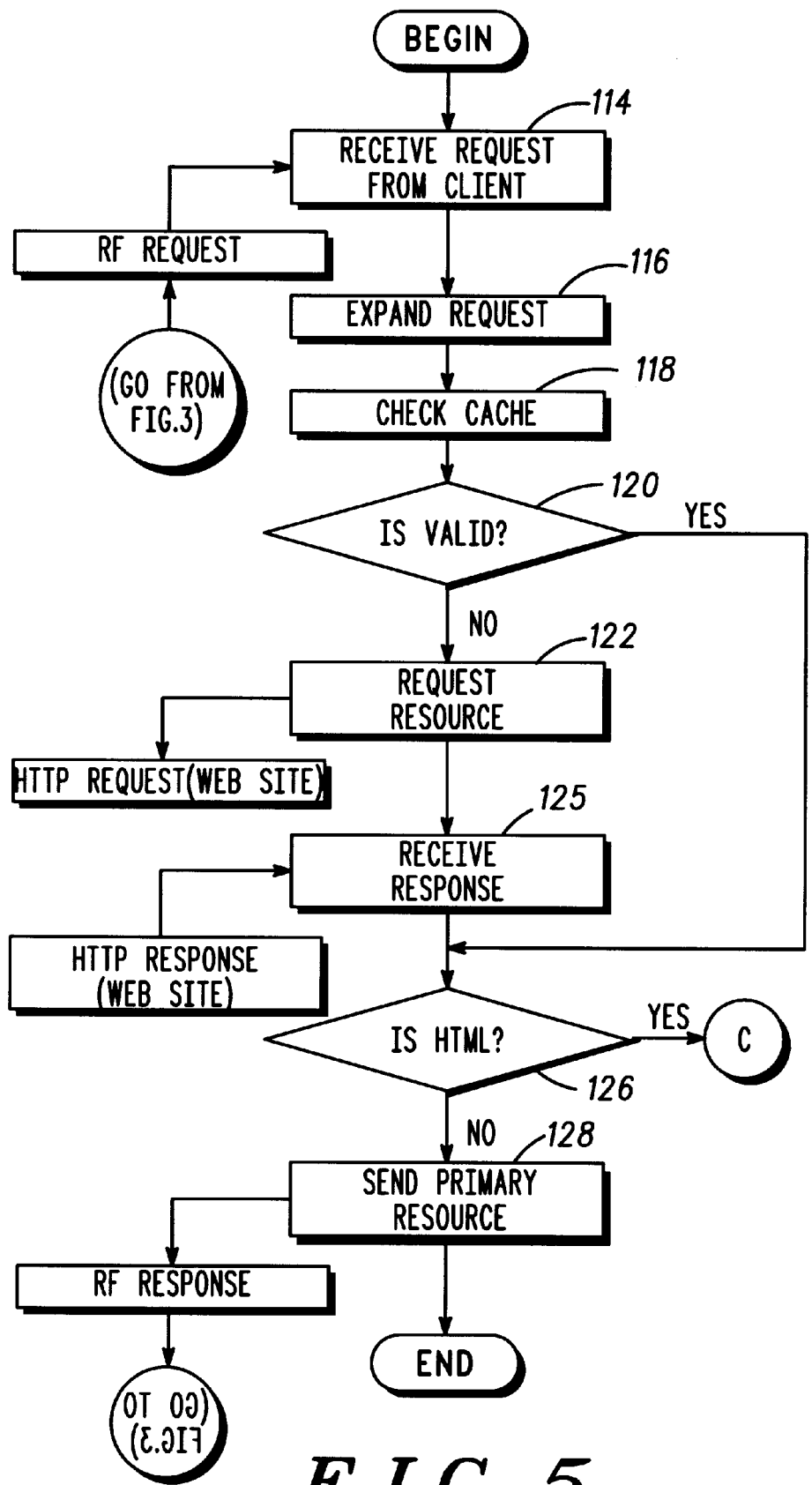
FIGS. 5 and 6 together are a flow chart of an operation of a fixed server according to the preferred embodiment of the invention.
Figure 6:
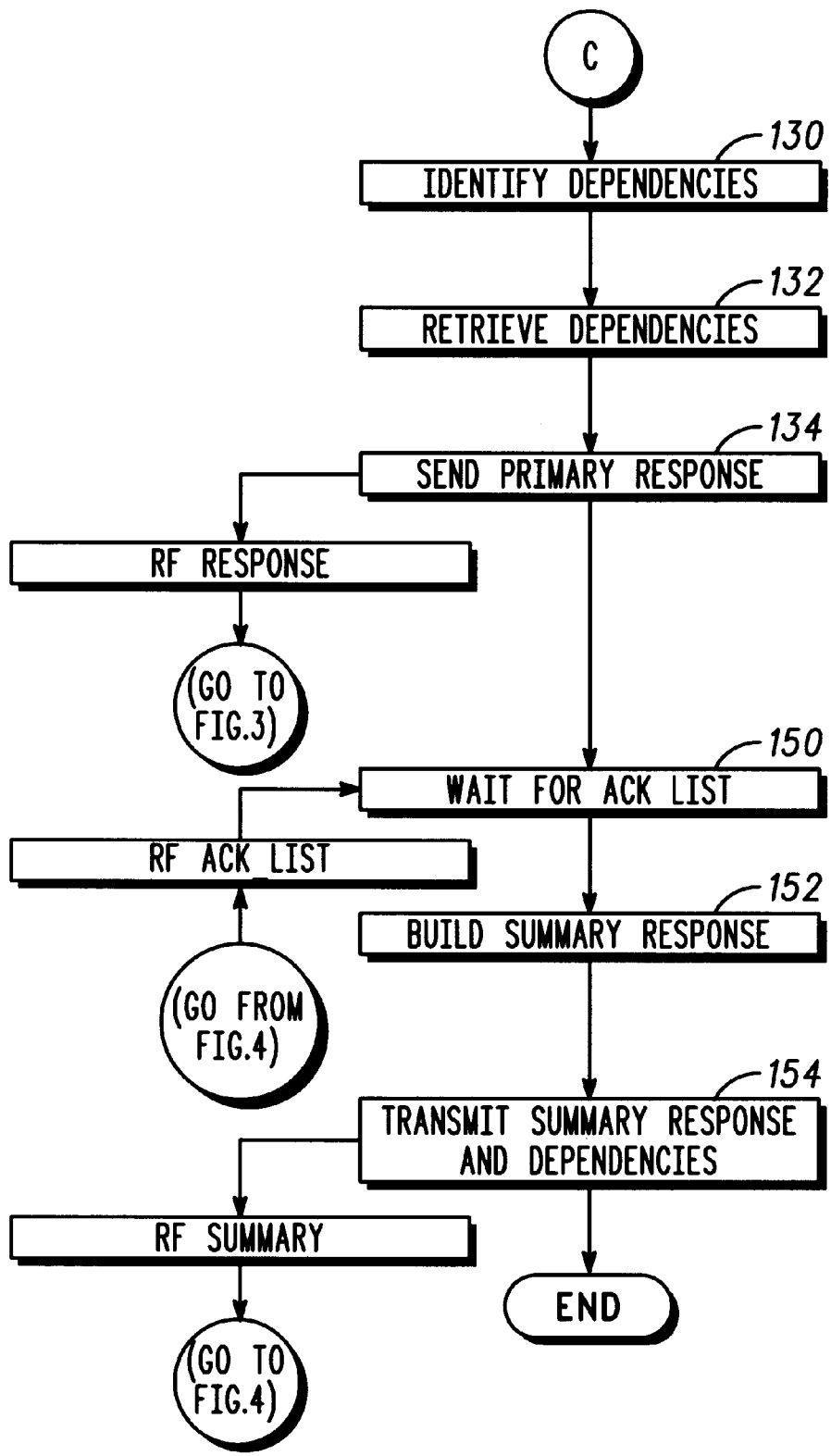

In FIGS. 5 and 6, the fixed server 30, upon receiving the HTTP request at step 114, expands the tokenized and compressed HTTP request at step 116. After expansion of the HTTP request, the fixed proxy software 32 inspects its local cache 44 at step 118 to determine whether it may have any version of the requested primary resource stored locally. Again, the manner in which the fixed proxy software 32 inspects its local cache 44 is described below in conjunction with FIG. 7. If the fixed server 30 determines at step 120 that the primary resource is not cached locally or if there is a version of the primary resource cached but that version of the primary resource has expired, the fixed proxy software 32 connects to the origin host 50 (e.g., Web site) identified in the primary URL (e.g., Web, Gopher, File Transfer Protocol, etc.) or to another proxy, to retrieve the primary resource requested by the mobile client 10 at step 122. After the fixed proxy software 32 receives a valid version of the primary resource either from step 118 or from step 125, the fixed proxy software 32 determines whether the HTTP response having the primary resource is in the form of a HyperText Markup Language (ETVL) at step 126.

If the HTTP response is not in a HTML form, the fixed proxy software 32 immediately sends the HTTP response to the mobile client 10 at step 128 in a tokenized and compressed form. The manner in which the HTTP response is tokenized is also described below. However, if the HTTP response is in a HTML form, the fixed proxy software 32 examines the resource identified by the primary URL to determine whether the mobile client 10 may need any other resources ("dependent resources", identified by absolute or relative URLs in tags in the HTML page) in order for the browser 12 to completely display the primary resource to the mobile user at step 130 (refer to FIG. 5). For example, an HTML page may contain images, Java applets, sounds, or other dependent resources which must be available for the browser 12 to properly display the page. If there are dependent resources identified, the fixed proxy software 32 examines its local cache 44, and if necessary, reconnects to the origin host 50 identified in the primary URL (e.g., for resources identified by relative URLs) or to other hosts (e.g., for resources identified by absolute URLs) and issues requests for those dependent resources (i.e., the fixed proxy software pre-fetches the dependent resources identified from the primary resource) and receives an updated resource from the origin host 50 or from whichever host the fixed proxy software 32 requested the resource. If the cached version of the primary resource of the mobile client 10 is up-to-date, the fixed proxy software 32 returns an indication that the mobile client 10 has the current version of the resource. Otherwise, the fixed proxy software 32 transmits the primary resource (in the form of a compressed HTTP response), along with information identifying the dependent resources upon which the primary resource depends, to the mobile client 10 at step 134.

When the mobile client 10 receives the HTTP response at step 136 of FIG. 3, the mobile proxy software 14 expands the HTTP response and updates its local cache 26 with the primary resource at step 138. If the mobile proxy software 14 determines at step 140 that the HTTP response the mobile proxy software 14 received at step 136 is not in a HTML form, the mobile proxy software 14 immediately sends the HTTP response to the browser 12 at step 108. However, if the mobile proxy software 14 determines at step 140 that the HTTP response it received at step 136 is in a HTML form, the mobile proxy software 14 identifies the dependent resources at step 142. Using the information received from the fixed proxy software 32 regarding the dependent resources, the mobile proxy software 14 examines its local cache 26 to determine whether it has any or all of them. Based upon this cache check (as described below in conjunction with the discussion of FIG. 7), the mobile proxy software 14 constructs a short acknowledgment list at step 144 which identifies at least the dependent resources that are not cached locally at the mobile client 10 and the dependent resources that are cached locally at the mobile client 10 but have expired. The mobile proxy software 14 sends the HTTP response having the primary resource to the browser 12 at step 146 and transmits the acknowledgment list over the narrow-band connection to the fixed server 30 at step 148. Following step 148, the operation of the mobile client 10 again pauses while further steps are performed at the fixed server 30 as shown in FIG. 6.

Returning to FIG. 6, after the fixed server 30 receives the acknowledgment list from the mobile proxy software 14 (at step 150), the fixed proxy software 32 determines whether there are any dependent resources to be sent based upon the acknowledgment list and builds a summary response at step 152. The summary response comprises one or more status codes (51, 52 and 53 of FIG. 2), there being one status code for each dependent resource (54, 55 and 56 of FIG. 2) requested from the mobile client 10 in the acknowledgment list. If all of the dependent resources are retrieved by the fixed server 30, there will be one dependent resource for each status code in the summary response. If there are dependent resources that are not retrieved successfully by the fixed server 30, the status code corresponds to an error condition (discussed in more detail below) which informs the mobile client 10 not to expect those particular resources. The summary response may be a single transmission (as shown at step 154) or the summary response may be fragmented into several transmissions with the status codes for all dependent resources included in the first fragment. If the summary response is fragmented, the mobile client does not have to transmit a reverse channel acknowledgment across the narrow-band communications link for the individual fragments. Thus, the status codes located in the summary response corresponds to those resources, if any, that are to follow.

The mobile client 10 receives from the fixed server 30 the summary response and the dependent resources (if any) at step 156 of FIG. 4. Using the same information received from the fixed server 30 regarding the dependent resources in the summary response, the mobile proxy software 14 modifies its local cache 26 to prepare to respond to any forthcoming requests from the browser 12 at step 158. Once the cache 26 is prepared, the mobile proxy software 14 responds to the initial request from the browser 12, using the primary resource (either from its cache or from the fixed server's 30 compressed HTTP response) with an HTTP response containing the resource identified by the URL which the mobile user requested. When the browser 12 issues a request for any dependent resource, the mobile proxy software 14 is able to respond immediately to the request, or the mobile proxy software 14 is able to hold the request until the resource is received from the fixed server 30. As the dependent resources are received by the mobile proxy software 14, the mobile proxy software 14 updates its local cache and fulfills any requests from the browser 12 which have been held.

Figure 7:
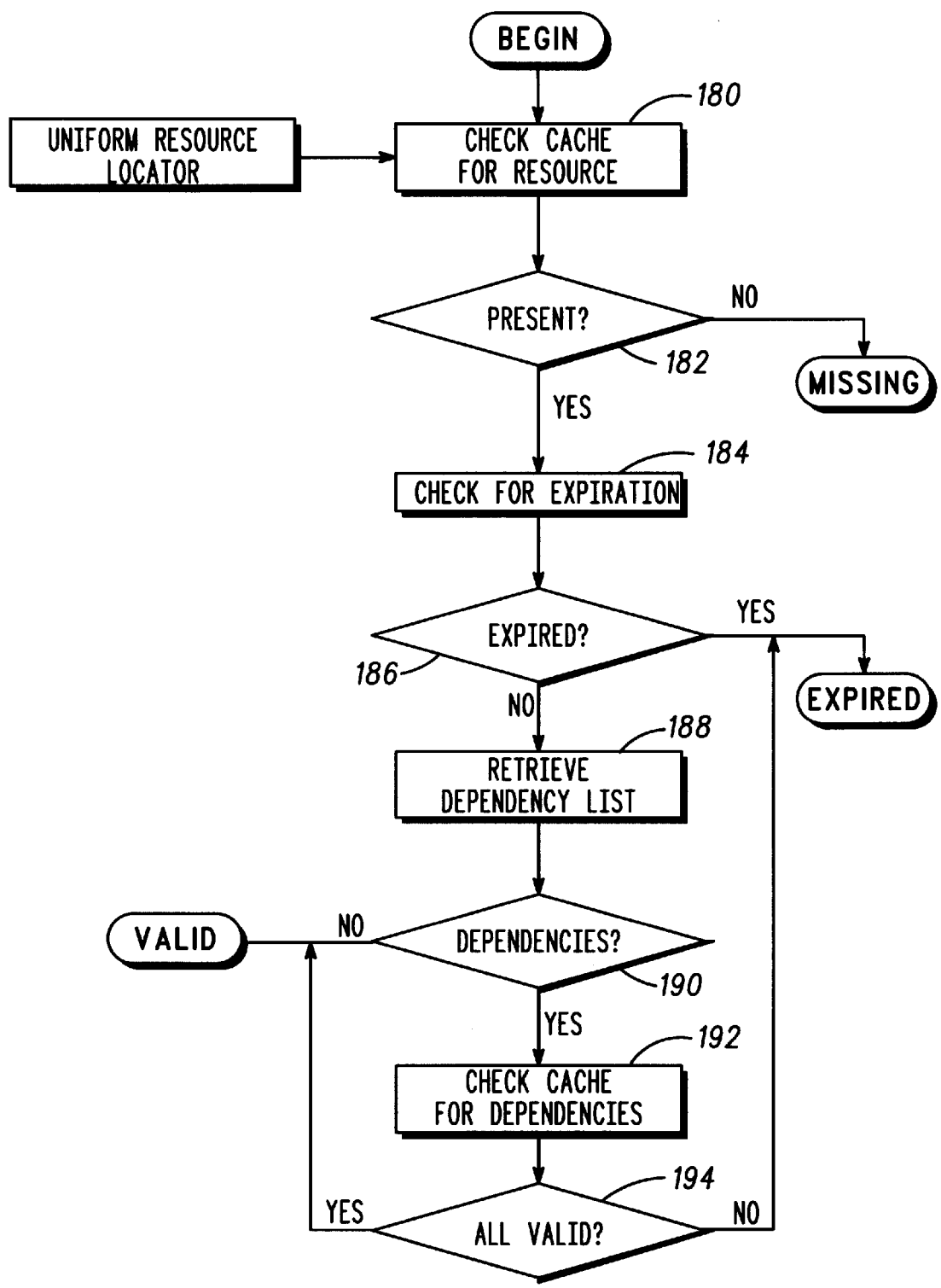
FIG. 7 is a flow chart of a method of operation for a cache check according to the preferred embodiment of the invention.

FIG. 7 is a flow chart of a method of operation for a cache check according to the invention. After a proxy examines its cache for a resource at step 180, the proxy must determine whether the requested resource is present in the cache at step 182 (i.e., whether the proxy has previously received the requested resource). If the resource is not present, the resource is not cached locally. If the resource is present, the proxy must check the expiration of the resource at step 184. Checking the expiration of the resource assures the proxy that the resource that is cached is up-to-date within a certain time frame (e.g., within 24 hours, etc. (depending on the nature of the resource)). If the resource has expired, the proxy must seek the resource from another source. If the resource has not expired, the proxy retrieves a dependency list at step 188. The proxy determines whether there are any dependent resources at step 190. If there are dependent resources, the proxy checks the cache further for the dependent resources at step 192. If the dependent resources are found in the cache, the proxy checks the expiration of the dependent resources at step 194. If the dependent resources have not expired, then they are valid. If the dependent resources have expired, then the proxy must seek the dependent resources from another source.

Standard HTTP requests and responses consists of a request or status line, zero or more headers consisting of a "field-name", a value and (optionally) an entity body. The request or status line, and the headers are ASCII text, separated by carriage-returns and linefeed control characters. The header (the request/status line and the headers, collectively) is always transmitted and the entity body, if present, is transmitted across the narrow-band communications links uncompressed. The wireless Web proxy protocol replaces the standard HTTP requests and responses with a binary format consisting of tokens for the standard parts of the request/status lines and for the standard header "field-names" and common values. Non-standard field-names (e.g., "X-" headers) or values are left untouched.

Tokens are fixed predetermined elements of the wireless Web proxy protocol. Each proxy is knowledgeable of the information that is tokenized and its corresponding token. The use of tokens allows the "sender" proxy to transmit less data across the narrow-band communications link.

Further, request headers and response headers are cached at the proxies. Examples of header fields are content type, content length, content coding, character sets, etc. Having the request and response headers cached at the proxies allows the "sender" proxy to only send new or changed fields in the header across the narrow-band connection link to the "recipient" proxy.

Moreover, certain responses containing "dynamic" HTML form consist of a large amount of boiler-plate language and only a small amount of resource-specific information (e.g., the result of a search against a search engine or database such as an on-line phone directory or a stock quote service). Boiler-plate language is specific to a HTML page (e.g., the body of a response). Thus, with a large boiler-plate language, the possibility exists that the user will experience long delays to receive only a small portion of resource-specific information. In order to prevent the user from experiencing such long delays, the wireless Web proxy system caches the response at the respective proxies. When the "recipient" proxy request the cached response again, the "sender" proxy compares the cached response with a current response (e.g., a response retrieved from the origin host). The "sender" proxy identifies the boiler-plate language between the cached response and the current response and only transmit the information that is not cached at the "recipient" proxy over the narrow-band connection. The "recipient" proxy combines the cached information with the information that is received over the narrow-band connection to re-construct the complete dynamic response.

This method is also very useful for responses corresponding to error conditions. Normally, a response corresponding to an error condition consists of a status-line which includes a status code, a reason phrase, a protocol version, zero or more headers and an entity body. These elements are essentially static and provide no information beyond the status code itself, although they usually total to several tens or hundred of bytes. As a result, the possibility exists that the user will experience long delays because all of the elements are transmitted across the narrow-band communications link. The wireless Web proxy system prevents the user from experiencing long delays by caching the above mentioned elements at the proxies and transmitting only the status code, corresponding to the error condition, across the narrow-band communications link. The complete HTTP response is constructed, based on the status code, at the mobile client and sent to the browser.

Moreover, as shown in FIG. 2, T1 is the time between the initial HTTP request and the time when the first response (e.g., the primary response) is transmitted from the fixed server 30 to the mobile client 10. Having a short duration of T1 allows the browser 12 to display the general information to the mobile user in a short period of time. Allowing the mobile user to quickly gain access of general information gives the mobile user an opportunity to cancel the request or submit a different request before completion of the page if the mobile user does not desire to see the entire page (e.g., if the mobile user does not like the type of information displayed, if the mobile user can obtain what he/she is looking for by looking at the general information, etc.).

Figure 8:
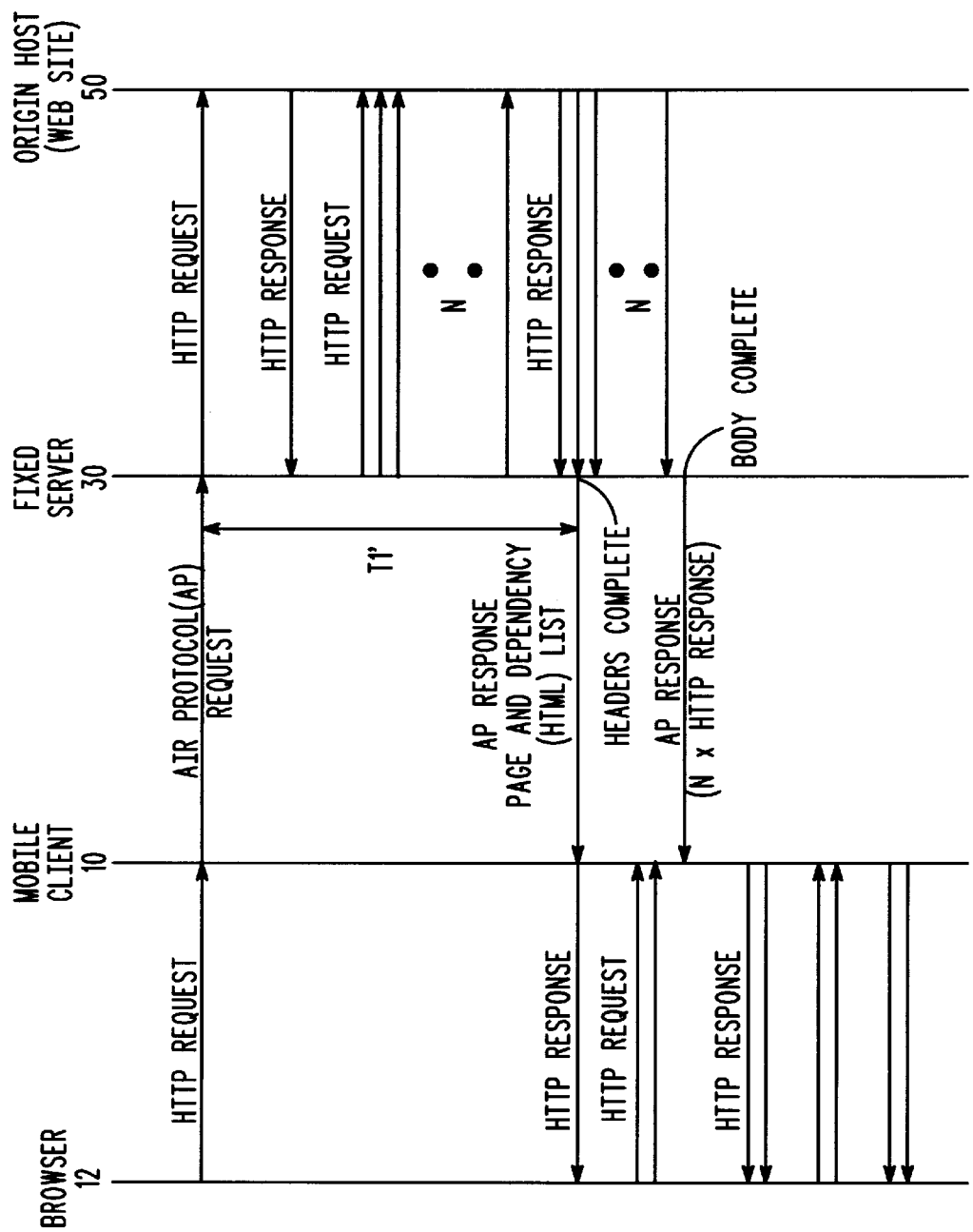
FIG. 8 is a bounce diagram of an alternative embodiment of the invention.

FIG. 8 is a bounce diagram of an alternative embodiment of the invention. The alternative embodiment is similar to the preferred embodiment. However, the alternative embodiment does not include the mobile proxy software 14 generating and transmitting an acknowledgment list to the fixed proxy server 32 as does the preferred embodiment. Instead, the alternative embodiment allows the fixed proxy server 32 to transmit to the mobile proxy software 14 a HTTP response having a page and dependency (HTML) list after the fixed proxy software 32 retrieves the primary resource and the headers of any dependent resources. In response to the mobile proxy software 14 sending the HTTP response to the browser 12, the browser 12 submits a HTTP request for the dependent resources to the mobile proxy software 14. Meanwhile, the fixed proxy server 32 continues to receive the bodies of the dependent resources from the origin host 50 and transmits the dependent resources to the mobile proxy software 14 when the bodies of those dependent resources are complete. The mobile proxy software 14 caches the dependent resources in its local cache 26 and sends the dependent resources to the browser 12 upon request.

With a single request, a primary resource, an acknowledgment list and a stream of dependent resources in a single transmission, the information necessary to fully render a complete page of information, for example a Web page, can be delivered to the mobile user's Web browser 12. While the invention has been described in conjunction with a specific embodiment thereof, it is evident that many alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method of providing resources to a browser comprising:
    sending a HyperText Transport Protocol (HTTP) request from the browser to a mobile client;
    sending the HTTP request from the mobile client to a fixed server;
    sending the HTTP request from the fixed server to an origin host;
    receiving a HTTP response at the fixed server from the origin host;
    requesting from the fixed server a plurality of dependent resources;
    commencing receipt of the plurality of dependent resources from the origin host;
    sending from the fixed server to the mobile client a list of resources when headers for the plurality of dependent resources have been completely received at the fixed server from the origin host but before bodies of the plurality of dependent resources have been completely received; and
    sending the bodies of the plurality of dependent resources from the fixed server to the mobile client in a collective transmission when the bodies of the plurality of dependent resources have been completely received at the fixed server.

2. The method of claim 1 further comprising the step of sending each resource from the mobile client to the browser upon request.

3. The method of claim 1, further comprising the steps of comparing, at the mobile client, the list of resources with resources stored in a cache;
    sending from the mobile client to the fixed server an acknowledgment list selectively indicating resources from the list of resources; and
    assembling, at the fixed server, resources selectively indicated by the acknowledgment list.

4. The method of claim 3, further comprising sending the bodies of the plurality of dependent resources selectively indicated by the acknowledgment list from the fixed server to the mobile client in a single transmission.

5. The method of claim 3, further comprising sending the plurality of dependent resources selectively indicated by the acknowledgment list from the fixed server to the mobile client in a fragmented transmission.

6. The method of claim 3, wherein status codes for all dependent resources are included in a first fragment of the fragmented transmission, indicating presence or absence of the dependent resources in later fragments.

7. The method of claim 1, wherein, in response to receipt of the list of resources at the mobile client, the browser submits HTTP requests for the plurality of dependent resources to the mobile client while the fixer server continues to receive the bodies of the dependent resources from the origin host.

8. A method of providing resources to a browser comprising:
    sending a HyperText Transport Protocol (HTTP) request from the browser to a mobile client;
    sending the HTTP request from the mobile client to a fixed server;
    sending the HTTP request from the fixed server to an origin host;
    receiving a HTTP response at the fixed server from the origin host;
    sending from the fixed server to the mobile client a list of resources;
    at the mobile client, comparing the list of resources with resources stored in a cache;
    sending from the mobile client to the fixed server an acknowledgment list selectively indicating resources from the list of resources;

assembling, at the fixed server, resources selectively indicated by the acknowledgment list; and sending the resources selectively indicated by the acknowledgment list from the fixed server to the mobile client in a fragmented summary response transmission with status codes for all dependent resources included in a first fragment thereof indicating presence or absence of the dependent resources in the summary response.

* * * * *